UNITED STATES PATENT OFFICE.

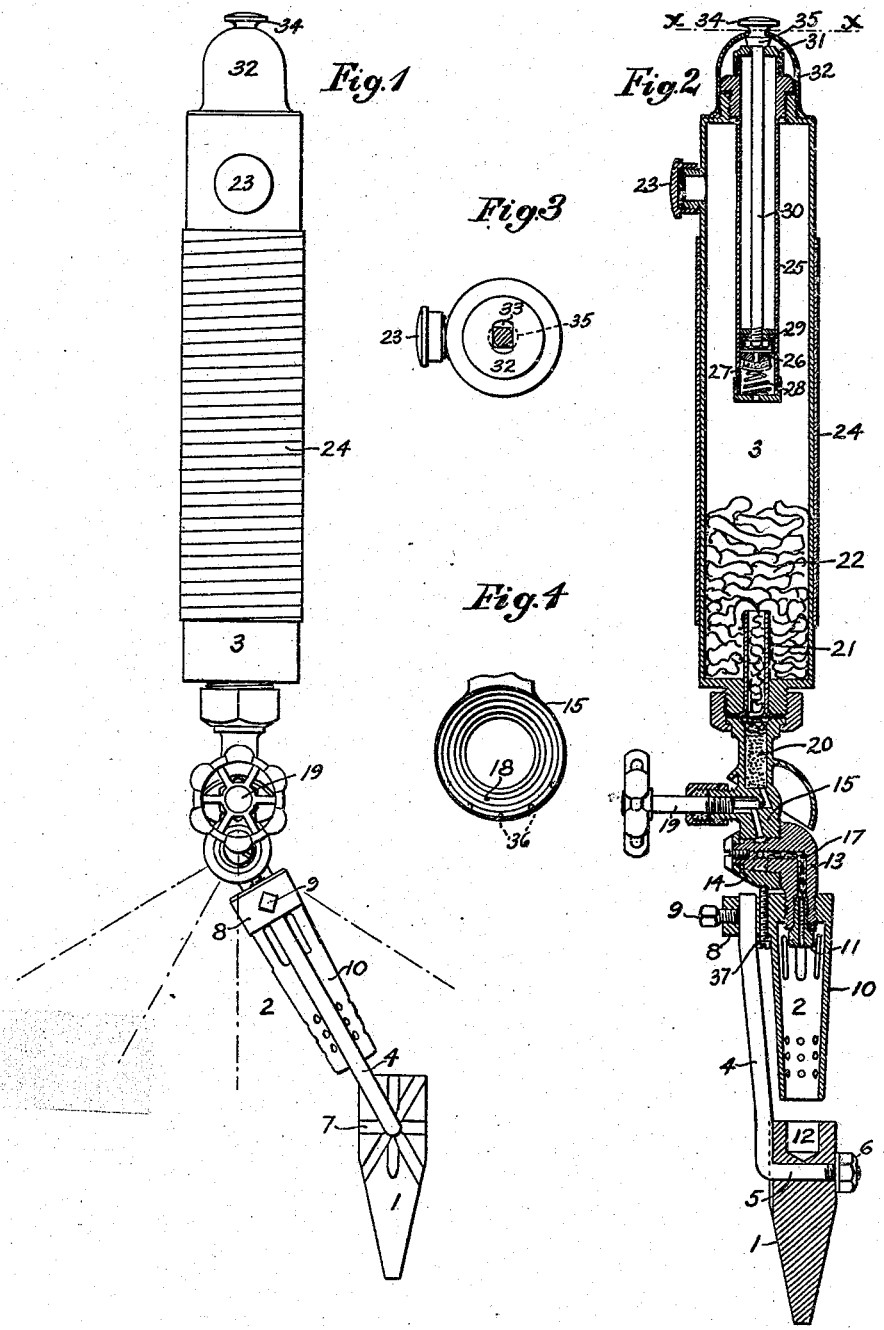
L. SCHEMNITZ.
SOLDERING TOOL.
APPLICATION FILED JAN. 7, 1909.
936,816. Patented Oct. 12, 1909.

LOUIS SCHEMNITZ, OF NEW YORK, N. Y., ASSIGNOR TO ATLAS TORCH AND BRASS COMPANY, A CORPORATION OF NEW YORK.

SOLDERING-TOOL.

936,816.  Specification of Letters Patent.  Patented Oct. 12, 1909.

Application filed January 7, 1909. Serial No. 471,131.

*To all whom it may concern:*

Be it known that I, LOUIS SCHEMNITZ, a subject of the Emperor of Austria-Hungary, residing in New York city, in the county and State of New York, have invented an Improvement in Soldering-Tools, of which the following is a specification.

My invention relates to improvements in soldering tools, and particularly to soldering tools of the self-heating type.

In self-heating soldering tools it has been proposed to use a soldering head of copper or other suitable material, together with a vapor burner for heating the head, and a fuel reservoir connected with the burner and the head, the whole being moved about together in using the tool.

One object of my invention is to so arrange a soldering tool constructed in this general manner that the position of the soldering head may be adjusted with relation to the fuel reservoir not only angularly but also by a bodily lateral movement of the head, so that the head and the reservoir may be arranged in various offset relations. This arrangement adapts the tool for use in various positions and upon various classes of work for which a tool without such adjustment is not well adapted. In this connection, I also, in the preferred embodiment of my invention, so arrange the burner that its operative relation with the soldering head is not disturbed by the adjustments above referred to, the head being therefore properly heated in any adjusted position.

Other objects of my invention are to improve and simplify the construction of devices of the character above referred to in various respects which will be hereinafter pointed out in connection with the description of the illustrated embodiment of the invention.

To the above ends my invention consists in the improved soldering tool hereinafter described and illustrated in the accompanying drawings, as the same is defined in the succeeding claims.

In the drawings, Figure 1 is a front elevation of a self-heating soldering tool embodying the present invention; Fig. 2 is a sectional side elevation of the same, looking from left to right in Fig. 1, with the adjustable members moved into the same plane; Fig. 3 is a detail plan view of the cap and the piston rod of the air pump, with the piston rod shown in section on the line $x$—$x$, in Fig. 2, and Fig. 4 is a detail front elevation of one member of the swivel joint connecting the burner with the fuel reservoir.

The illustrated embodiment of my invention comprises a soldering head 1, heated by a vapor burner 2, and connected with a reservoir 3, which contains fuel for the burner and also constitutes a convenient handle for the tool.

The soldering head 1 is connected with the rest of the tool by a shank 4, and the connection between the head and the shank is arranged to permit angular adjustment of the head on the shank. To this end the head has a transverse opening which receives a portion 5 of the shank bent nearly at a right-angle with the body of the shank. A nut 6 is threaded on the end of the portion 5, and by tightening this nut the head may be fixed securely upon the shank. In order to render the head perfectly secure in its adjusted angular positions recesses 7 are formed in a lateral surface of the head, radiating from the transverse opening. In each position of the head one of these recesses is engaged by the main portion of the shank, and this interlocked relation positively prevents rotation of the head on the shank except when the nut 6 is unscrewed to a substantial extent.

In Fig. 1 the shank engages a recess inclined to the longitudinal axis of the head, so as to hold the head at an angle of about 30° with the shank, while in Fig. 2 the shank engages a recess parallel with the axis of the head.

The upper end of the shank 4 engages a socket in a lug 8 and is adjustably and removably fixed therein by a set screw 9. The lug 8 is integral with the body or combustion tube 10 of the burner 2.

The burner is of the ordinary Bunsen type, and has a jet nozzle 11 through which the vaporized fuel is directed toward the soldering head. Since the pivotal support 5 of the soldering head is always held, by the connections above-described, directly in line with the burner the head is always properly heated by the burner regardless of the angular position of the head on the stem. A recess 12 is formed in the upper end of the head to increase the surface exposed to the flame when the head is in normal position.

The burner is mounted upon an elbowshaped member 13 which is provided with a passage 17 to conduct the fuel to the burner. The member 13 is pivotally connected with the fuel reservoir, and the member 13, the lug 8, and the shank 4, being normally connected rigidly together, constitute mechanically a link connecting the reservoir and the soldering head and pivotally connected with each. The member 13 is not pivoted directly upon the reservoir, but a valve body 15 and a needle valve 19 are interposed to control the fuel supply. The member 13 has a tapered stem fitting and turning in a tapered socket on the valve body and held therein by a screw. To effect a liquid-tight joint between these parts they are provided with opposed surfaces 18 provided with concentric interlocking corrugations, which increase the area of contact of the surfaces and afford only a tortuous passage for the escape of the volatile fuel. The stem 14 is provided with suitable passages to connect the passage 17 with the passage through the valve body.

The supply of fuel controlled by a needle valve 19 of ordinary form working in the valve body 15.

After the burner has been started in the usual manner by a preliminary heating over a flame, the heat absorbed by the combustion tube 10 is conducted back into and through the nozzle 11, the member 13 and the valve body, so that the fuel is vaporized while passing through these parts. In order to render this vaporization more certain and complete and to adapt the device for the use of fuels of high boiling points a passage 17 in the member 13 and a passage in the nozzle are filled with comminuted heat-conducting material, copper wires being suitable for this purpose. This material absorbs heat from the walls of the passages and transmits it to the liquid fuel, and this has the effect of increasing the area of heated surface to which the fuel is exposed. For a similar purpose copper filings are placed in a recess 20 located in the passage between the reservoir and the valve body. These filings act also to strain the fuel and free it from solid impurities which might clog the burner.

The fuel is drawn from the reservoir through a feed tube 21 extending a short distance into the lower end of the reservoir. To regulate the supply of fuel absorbent material 22 such as cotton wicking, is packed closely in the feed tube and in the lower portion of the reservoir. This wicking acts, by capillary force, to insure a supply of fuel in whatever position the reservoir may be held and it prevents the escape, through the burner, of the air by which the fuel is subjected to pressure, in case the tool is momentarily inverted so as to raise the feed tube and the wicking above the level of the fuel in the reservoir. The wicking acts also to strain the fuel.

The reservoir is filled with gasolene or other spirituous fuel through an opening closed by a screw cap 23. Air is also pumped into the reservoir in the usual manner to subject the fuel to the pressure necessary to cause it to flow through the burner.

The air pump has a barrel 25 which is, for the most part, inclosed within the reservoir, to render the device compact. A diaphragm 26 with a central passage and a convex lower surface is located near the lower end of the pump barrel and provides a valve seat for an air valve 27 provided with a facing of cork or other suitable material. This valve is held normally to its seat by a spring 28.

The air pump piston 29, which is provided, in the usual manner, with a cup-leather, is actuated by a piston rod 30. The upper end of the pump barrel projects from the upper end of the reservoir and is provided with a screw cap 31, through which the piston rod passes loosely so as to afford an inlet for the air. The piston rod is thus accessible from without the reservoir, and it is provided with a head 34 by which it may be conveniently operated.

To impart a neat finish to the upper end of the reservoir, a dome-shaped cap 32 is screwed thereon so as to inclose the projecting end of the pump barrel. This cap also affords provision for retaining the piston rod of the pump in its inward position when not in use, to keep it out of the way of the operator in handling the tool. The piston rod passes through an elongated opening 33 in the cap 32, and is provided with an elongated enlargement 35 a short distance below the head 34. The enlargement may, in one position, be inserted through the opening 33, but upon being turned, thereafter, through about a quarter turn, it is locked within the cap.

The use of the pivoted connection between the reservoir and the burner, in combination with the pivotal connection between the soldering head and the shank, permits the arrangement of the tool in a great variety of positions to adapt it to work of different characters, and, in particular, it permits an offset position of the soldering head, such as is illustrated in Fig. 1. In any such adjusted position the soldering head is maintained rigidly in its relation to the shank by the means above described, and means are also provided for maintaining the upper pivotal joint in adjusted position. These means comprise a set screw 37 which is threaded into the lug 8 and may be made to engage any one of a number of recesses 36 on the fixed member of the joint. In the illustrated embodiment of the invention these recesses are arranged to maintain the burner and the shank 4 in any of the positions indicated by dot-and-dash lines in Fig. 1.

The heating effect of the burner is regulated by means of the air pressure produced by the air pump and by the degree to which the valve 19 is opened, and it may also be modified by loosening the set screw 9 and shifting the shank 4 in its socket so as to adjust the soldering head toward or from the end of the burner.

To protect the hand of the user against heat conducted from the burner to the reservoir the latter is partly enveloped in a lagging 24 of cane or other suitable material and this also affords a more secure grip than the smooth metal surface of the reservoir.

My invention is not limited to the details of construction and operation of the illustrated embodiment, but may be embodied in various other forms within the nature of the invention and the scope of the following claims:

I claim:

1. A self-heating soldering tool having, in combination, a soldering head, a fuel reservoir and connections between the head and the reservoir constituting a link pivoted to the head and the reservoir so as to be angularly adjustable with relation to each.

2. A self-heating soldering tool having, in combination, a soldering head, a fuel reservoir, connections between the head and the reservoir constituting a link pivoted to the head and the reservoir so as to be angularly adjustable with relation to each, and a burner nozzle connected with said link so as to be angularly adjusted therewith.

3. A self-heating soldering tool, having, in combination, a soldering head, a fuel reservoir and connections between the head and the reservoir constituting a link pivoted to the head and the reservoir on substantially-parallel axes so as to be angularly adjustable with relation to each.

4. A self-heating soldering tool, having, in combination, a soldering head, a fuel reservoir, connections between the head and the reservoir constituting a link pivoted to the head and the reservoir, and a burner nozzle connected with said link so as to be adjustable therewith, the link having provision for adjustment of the head toward or from the burner nozzle and for conducting fuel from the reservoir to the burner nozzle through its pivotal connection with the reservoir.

5. A self-heating soldering tool having, in combination, a fuel reservoir constituting a handle for the tool, a soldering head and a burner connected with the reservoir, an air pump having a barrel located chiefly within the reservoir but with one end projecting therefrom and a piston rod projecting from said end of the pump barrel and a cap mounted on the reservoir and covering the end of the pump barrel, the cap having an elongated opening through which the piston rod passes, and the piston rod being provided with an elongated interlocking portion engageable with the cap at said opening by a partial rotation of the piston rod, to retain the piston rod in its inward position when it is not in use.

LOUIS SCHEMNITZ.

Witnesses:
CLARENCE G. GALSTON,
FLORENCE B. ROY.